2,934,514

BLENDS OF VINYLIDENE CHLOROFLUORIDE POLYMERS WITH ETHYLENE/VINYLENE CARBONATE COPOLYMERS

Ival O. Salyer and John D. Calfee, Dayton, Ohio, assignors to Monsanto Chemical Company, St. Louis, Mo., a corporation of Delaware No Drawing. Application December 11, 1953
Serial No. 397,792

9 Claims. (Cl. 260—45.5)

This invention relates to polymers of 1-chloro-1-fluoroethylene, also known as vinylidene chlorofluoride. In one aspect the invention pertains to improving the physical properties of homopolymers or copolymers of vinylidene chlorofluoride. In other aspects the invention provides blends of polyvinylidene chlorofluoride with ethylene-vinylene carbonate copolymer.

Polymers of 1-chloro-1-fluoroethylene (vinylidene chlorofluoride) have many properties which are markedly different from those of polymers of closely related compounds such as vinyl fluoride, vinylidene chloride, vinyl chloride, or vinylidene fluoride. Polyvinylidene chlorofluoride is a soft, rubbery material at ordinary temperatures, e.g., 20° C., exhibits high tensile elongation, is comparatively inert chemically, and is non-inflammable, however, polyvinylidene chlorofluoride is of comparatively low tensile strength. Further, on lowering the temperature from room temperature, it quickly becomes stiff and then with only a slight further lowering of temperature becomes extremely brittle. Thus, its low temperature properties leave much to be desired, and the range of temperature in which the material is stiff rather than rubbery, but yet not brittle, is very small. It will of course be understood that the extent to which any particular polymer of vinylidene chlorofluoride has one or more of the foregoing characteristics will be dependent to a considerable extent upon the method of preparing the polymer, and upon the presence or absence of other ethylenically unsaturated monomers copolymerizable with the vinylidene chlorofluoride during the polymerization procedure. However, the preceding description can be taken as generally applicable to polymers of vinylidene chlorofluoride with variations as indicated.

The polymerization of vinylidene chlorofluoride is taught in U.S. Patent No. 2,362,094 to Mary Renoll. Further, copolymers of vinylidene chlorofluoride with other ethylenically unsaturated monomers copolymerizable therewith are taught in U.S. Patent No. 2,328,510 to Charles A. Thomas. The present invention is applicable to homopolymers or copolymers of vinylidene chlorofluoride prepared as generally described in said patents, and also to specific variations of the processes described therein. The invention is likewise applicable to homopolymers of vinylidene chlorofluoride prepared by polymerization of the monomer at high pressures of at least 5,000 pounds per square inch and preferably at least 15,000 pounds per square inch as described and claimed in copending application of John D. Calfee, Serial No. 322,157, filed November 23, 1952, now U.S. Patent 2,777,835, issued January 15, 1957.

An object of this invention is to provide blends of polymers of vinylidene chlorofluoride having properties improved over said polymers alone. Another object is to improve the low temperature properties of polyvinylidene chlorofluoride. A further object is to increase the tensile strength of vinylidene chlorofluoride polymers. Yet another object is to lower the brittle temperature of vinylidene chlorofluoride polymers. A still further object is to increase the range of temperature in which vinylidene chlorofluoride polymers are stiff and non-rubbery and yet not brittle. An additional object of the invention is to provide blends of vinylidene chlorofluoride polymers with other polymeric materials wherein the components of the blend exhibit high compatibility. Further objects and advantages will be apparent, to those skilled in the art, from the accompanying disclosure and discussion.

In accordance with the present invention in preferred embodiments, one or more of the foregoing objects are attained by blending with homopolymers or copolymers of vinylidene chlorofluoride an ethylene/vinylene carbonate copolymer. Copolymers of ethylene with vinylene carbonate are new materials, and are described in detail in the copending application of Earl W. Gluesenkamp and John D. Calfee, Serial No. 355,859 filed May 18, 1953, now U.S. Patent No. 2,847,398, issued Aug. 12, 1958, the contents of which application are incorporated herein by reference. Preferred blends are those made from rubbery homopolymers or copolymers of polyvinylidene chlorofluoride, i.e., those that are rubbery at room temperature. Such blends preferably contain an amount of ethylene/vinylene carbonate copolymer that is from 1 to 30 weight percent of the combined weights of the ethylene/vinylene carbonate copolymer and the polymer of vinylidene chlorofluoride. In general, vinylidene chlorofluoride polymers are improved in the practice of the invention, in that the tensile strength is increased, the tensile elongation is decreased, the temperature at which the material becomes brittle becomes lower, and/or the temperature at which the material changes from stiff to rubbery character is increased. The preferred blends of this invention are completely compatible at least to the extent that visual observation indicates no lack of clarity or transparency, and are apparently perfectly homogeneous.

As indicated hereinbefore the invention is of general applicability to polymers of vinylidene chlorofluoride. It is particularly useful for rubbery polymers of vinylidene chlorofluoride that are either homopolymers or that contain a sufficiently small quantity of comonomer, for example, styrene, acrylonitrile, vinyl chloride, vinyl acetate, vinylidene chloride, methyl methacrylate, vinylfluoride, ethylene, as will not change the inherently rubbery characteristics of the polymer.

The terms "polyvinylidene chlorofluoride," "vinylidene chlorofluoride polymer," and "polymer of vinylidene chlorofluoride," as used herein are intended to include homopolymers of vinylidene chlorofluoride, i.e., polymers prepared by subjecting to polymerization a monomeric material consisting of vinylidene chlorofluoride as the sole polymerizable constituent, and copolymers of vinylidene chlorofluoride with other ethylenically unsaturated monomers copolymerizable therewith. While the invention can be applied to copolymers of vinylidene chlorofluoride containing a major proportion, i.e., over 50 weight percent, vinylidene chlorofluoride, it is most useful as applied to polymers of vinylidene chlorofluoride prepared from monomers containing from 100 to 85 weight percent vinylidene chlorofluoride and 0 to 15 weight percent of a comonomer. Of course, polymers made from vinylidene chlorofluoride and two or more comonomers are also applicable. In any event, the polymer employed should have a high molecular weight suitable for the use intended.

The term "blend" is used herein in a broad sense to include both mechanical blends of preformed vinylidene chlorofluoride polymers with preformed ethylene/vinylene carbonate copolymers, and blends prepared by polymerizing monomeric vinylidene chlorofluoride in the presence of preformed ethylene/vinylene carbonate copolymers. Thus, preformed vinylidene chlorofluoride polymer and preformed ethylene/vinylene carbonate copolymer can be brought together into intimate admixture by any suitable mechanical means, such as by milling on cold or heated mill rolls, mixing in a Banbury mixer, solution in a common solvent, such as xylene, benzene, pyridine, etc., or mixing emulsions, suspensions, or dispersions of the two polymers and coagulating same. On the other hand, an ethylene/vinylene carbonate copolymer can be incorporated in monomeric vinylidene chlorofluoride and the resulting material subjected to polymerization. For best results such polymerization should be carried to a high conversion, such as greater than 95 percent conversion to high molecular weight vinylidene chlorofluoride polymer. In preparing such a "polymerization blend," the ethylene/vinylene carbonate copolymer should be thoroughly and intimately dispersed in the monomeric material prior to polymerization. It is believed highly probable that in the practice of the embodiments of this invention involving polymerization of vinylidene chlorofluoride in the presence of preformed ethylene/vinylene carbonate copolymers, a certain amount of interpolymerization occurs between vinylidene chlorofluoride and ethylene/vinylene carbonate copolymer molecules, with the resultant formation of what can be called a graft polymer, although it is by no means certain and is even doubtful that all molecules of ethylene/vinylene carbonate copolymer become united with one or more vinylidene chlorofluoride monomer units. However, the invention is not to be limited by any theory of particular reaction mechanism.

Homopolymer or copolymer of vinylidene chlorofluoride, as described herein, can be made by any of the known vinylidene chlorofluoride polymerization techniques from monomeric material comprising vinylidene chlorofluoride, either with or without ethylene/vinylene carbonate copolymer present. One of the most common of said techniques is mass polymerization wherein the only material present in the reaction mixture is the monomer or monomers plus any catalyst and any modifier that may be used to affect the molecular weight, plus ethylene/vinylene carbonate copolymer if it is to be incorporated during the polymerization, and no added solvent or other reaction medium is present. Suitable catalysts are those that promote free radicals, e.g., peroxy and azo catalysts. By way of example are benzoyl peroxide, diacetyl peroxide, dimethylphenylhydroperoxymethane, $\alpha,\alpha'$-azobisisobutyronitrile. Solvent polymerization is similar to mass polymerization, except that a solvent for the monomer and/or polymer is also present during the polymerization. Use of a solvent results in a lower molecular weight polymer. The polymerization of vinylidenechlorofluoride, with or without comonomers, can also be effected advantageously by suspension or emulsion techniques. Both of these techniques involve the use of a non-solvent for the monomer and polymer, but in the suspension technique the particles of monomer and ultimately of the polymer are comparatively large, while in the emulsion procedure the particles are quite small and the final product is a stable latex. A suitable method for effecting the suspension polymerization of vinylidene chlorofluoride is to employ water and a small amount of an added suspending agent, such as a vinyl acetate-maleic anhydride copolymer or certain phosphates, a lauroyl peroxide catalyst, and a limited amount of an emulsifier such as glyceryl monostearate. A suitable emulsion polymerization procedure is to employ water along with potassium persulfate catalyst, any suitable emulsifier, and no polymerization modifier. Emulsion and suspension polymerization can be effected at temperatures which are chosen in accordance with the catalyst system used but which may for example be from 40° C. to 60° C. Use of a high pressure, i.e., at least 5000 pounds per square inch, is a particularly advantageous method of polymerizing vinylidene chlorofluoride, and generally results in polymer that is tougher, higher in molecular weight, has greater resistance to flow at elevated temperatures, and is more easily processed on a hot mill, than is the case of polymers made at autogenous pressures. Another very useful vinylidene chlorofluoride polymerization process for preparing polymers that can be used in the practice of the present invention employs penetrating ionizing radiation, preferably gamma-rays from radioactive materials such as cobalt-60, as in accordance with the invention described and claimed in the copending application of William H. Yanko and John D. Calfee, Serial No. 318,098, filed October 31, 1952.

The materials blended with polymers of vinylidene chlorofluoride in the practice of the present invention are copolymers of ethylene with vinylene carbonate. Properties of vinylene carbonate and methods of preparing same are described by Newman and Addor, Jour. Amer. Chem. Soc., 75, 1263, March 5, 1953. Vinylene carbonate has the structural formula:

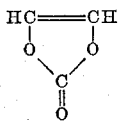

A suitable method of preparing vinylene carbonate is chlorination of ethylene carbonate to form monochloroethylene carbonate, followed by dehydrochlorination of the latter by reaction with an amine, resulting in vinylene carbonate.

The invention encompasses blends of vinylidene chlorofluoride polymers with ethylene/vinylene carbonate copolymers containing ethylene and vinylene carbonate in all proportions. Most copolymers will contain from 5 weight percent to 99 weight percent ethylene and from 95 weight percent to 1 weight percent vinylene carbonate, based upon the combined weights of the monomers entering into the copolymer. In its broadest aspects the invention contemplates use of polymers of ethylene containing the smallest significant quantity of vinylene carbonate, which may be 1 weight percent or less, and at the other extreme the use of polymers of vinylene carbonate containing the smallest significant quantity of ethylene which may be 1 weight percent or less, and all proportions between those extremes. However, of particular interest are ethylene/vinylene carbonate copolymers containing a major proportion by weight of ethylene and a minor proportion by weight of vinylene carbonate combined in the copolymeric material. Copolymer compositions within the range of ethylene:vinylene carbonate weight proportions of 99:1 to 70:30 are ordinarily most useful in the practice of the invention. It is often preferred to prepare copolymers by polymerization of monomeric material comprising ethylene and vinylene carbonate, containing a sufficiently high proportion of ethylene to produce a polyethylene-like material, i.e., a high molecular weight normally solid polymer having the general properties of polyethylene per se, i.e., polyethylene prepared from monomeric material consisting of ethylene.

Any suitable combination of polymerization conditions resulting in the formation of a copolymer from a monomeric material comprising ethylene and vinylene carbonate can be employed. However, in preferred embodiments a monomeric material comprising ethylene and vinylene carbonate is subjected to copolymerization at high pressures, preferably at least 5000 pounds per square inch. Pressures of at least 15,000 pounds per square inch are more preferably employed, resulting in a product having high self-compatibility (homogeneity). Often optimum results are obtained at pressures within the range of 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture discs, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed are no barriers to commercial use of the high pressure copolymerization process. The copolymerization is preferably carried out at temperatures within a fairly broad range, which is preferably 35° C. to 125° C. The preferred range is 50° C. to 100° C.

The invention in its broadest aspects is not departed from by blending vinylidene chlorofluoride polymers with ethylene/vinylene carbonate copolymers made by providing, in addition to ethylene and vinylene carbonate, other monomeric materials capable of entering into the polymerization reaction. Thus, vinyl chloride, vinylidene chlorofluoride, vinyl acetate, vinyl fluoride, propylene, styrene, acrylonitrile, and other unsaturated organic compounds can be used as comonomers along with the ethylene and vinylene carbonate. This of course will affect the polymer properties but the amount can be chosen so as to retain the advantageous results of the copolymerization of vinylene carbonate with ethylene.

In copolymerizing ethylene with vinylene carbonate it is preferred to employ catalysts of the free-radical promoting type, principal among which are peroxide-type polymerization catalyst and azo-type polymerization catalysts, e.g., diacetyl peroxide, dimethylphenylhydroperoxymethane, diazoaminobenzene, in small but catalytic amounts usually within the range of 0.001 to 0.5 percent by weight of the comonomers. The ethylene/vinylene carbonate copolymerization can be effected in the presence of catalytic amounts of oxygen, as within the range of 10 to 200 parts oxygen per million parts monomeric material on the weight basis. The copolymerization can also be effected under the influence of ionizing radiation of polymerizing intensity, such as gamma rays provided by cobalt-60 or other radioactive substances, using the general procedures described and claimed in the copending application of William H. Yanko and John D. Calfee, Serial No. 318,098, filed October 31, 1952. Copolymers of ethylene and vinylene carbonate employed in accordance with the present invention are inclusive of modified polymeric materials known as telomers, obtained by carrying out the copolymerization in the presence of materials which are non-polymerizable under the conditions employed but which combine with a plurality of units of the monomers, e.g., carbon tetrachloride, organic acids, esters, mercaptans, alcohols, etc. Additional details directed to the preparation of ethylene/vinylene carbonate copolymers, which can be used in the present invention, will be found in the above-mentioned copending application of Earl W. Gluesenkamp and John D. Calfee, Serial No. 355,859, filed May 18, 1953.

Vinylene carbonate units in the ethylene/vinylene carbonate copolymers are subject to hydrolysis, whereby part or all of said units are converted to units of the folowing type in the polymer:

The present invention includes blends of vinylidene chlorofluoride polymers with ethylene/vinylene carbonate copolymers that have undergone hydrolysis, and even that subsequent to hydrolysis have been subjected to further treatment to react other materials with part or all of the hydroxy groups, e.g., with aldehydes to produce acetals.

Particularly useful compositions of the present invention are blends of from 99 to 50 parts by weight of vinylidene chlorofluoride polymer with from 1 to 50 parts by weight of ethylene/vinylene carbonate copolymer, and often preferably from 95 to 75 parts vinylidene chlorofluoride polymer with from 5 to 25 parts ethylene/vinylene carbonate copolymer. Such blends can also include, if desired, additional materials such as plasticizers, thermal stabilizers, fillers, dyes, pigments, other polymers, and the like. Those skilled in the art, having had the benefit of the present disclosure, will be able to choose by simple tests suitable proportions of a particular vinylidene chlorofluoride polymer and a particular ethylene/vinylene carbonate copolymer to give a blend having characteristics desired for a particular use.

Blends prepared in accordance with the present invention can be used for preparation of flexible films, tubing or moldings. If desired the blend can be modified by plasticization for additional softening, filled with reinforcing agents, colored by addition of suitable colorants, and/or vulcanized by the incorporation of appropriate accelerators and cross-linking agents. End use articles which might be fabricated from the blend, include: Flexible films used as shower curtains, food packaging, or in other applications where freedom from plasticizer extraction and exudation problems would be advantageous. Medical and surgical tubing use is also possible, for the same reason. As vulcanizates in rubber applications the blends have the advantages of good initial color and excellent resistance to ozone and other degradative influences.

The following examples provide details of certain preferred embodiments of the invention. The data are to be taken as exemplary, and the invention in its broadest aspects is not limited to the particular conditions, proportions, and materials set forth therein.

*Example 1*

Polyvinylidene chlorofluoride employed in Example 3 below was prepared in the following manner. Highly purified vinylidene chlorofluoride monomer was polymerized at 35,000 pounds per square inch pressure in the presence of gamma-radiation from a 50-millicurie cobalt-60 source. After 64 hours at 50° C. under these conditions, polyvinylidene chlorofluoride of high molecular weight was formed in 74 percent yield. Properties of this polymer are given in Example 3 below.

*Example 2*

The ethylene-vinylene carbonate copolymer employed in Example 3 below was prepared as follows:

A mixture of ethylene and vinylene carbonate monomers (5 to 1 weight ratio) was polymerized at 20,000 pounds per square inch with $\alpha,\alpha$-azodiisobutyronitrile catalyst. The bomb was charged with the monomer mixture at $-78°$ C. and while the mixture was still cold, it was pressured to 6000 pounds per square inch with water. As the temperature rose to about 80° C., the pressure reached a maximum of 22,000 pounds per square inch. Under these conditions rapid polymerization occurred (1.75 hours) and the pressure dropped to 12,000 pounds per square inch. The copolymer was formed in 25 percent yield. It was found by direct oxygen analysis to contain 10.7 weight percent vinylene carbonate units in the copolymer.

The ethylene-vinylene carbonate copolymer had the following properties:

Tensile strength at failure, p.s.i _____ 2229.
Tensile elongation at failure, percent __ 470.
Clash-Berg data:
    $T_f$ (° C.) _____ $-24$.
    $T_{2000}$ (° C.) _____ 82.
    Stifflex range (° C.) _____ 106.
Approximate molecular weight (by melt viscosity) _____ 19,000.
Appearance _____ Almost clear (slightly hazy).
Density _____ 0.96.

Data given in the preceding table were determined by the following test procedures:

Clash-Berg modulus characteristics:
A. Brittle temperature ($T_f$), °C.
B. Rubber temperature ($T_{2000}$), °C.

This test is a measure of the stiffness of a plastic specimen as a function of temperature, measured by means of a torsional test. The test is essentially that described by Clash and Berg, Industrial and Engineering Chemistry, 34, 1218 (1942). The brittle temperature ($T_f$) is the temperature at which the stiffness modulus is 135,000 p.s.i. The rubber temperature ($T_{2000}$) is the temperature at which the stiffness modulus is 2000.

Tensile properties:
Strength to break, p.s.i.
Elongation to break, percent

These tests are determined by the standard tests ASTM D638-52T and D412-41.

*Example 3*

Ninety parts by weight of polyvinylidene chlorofluoride prepared as described in Example 1, and 10 parts by weight of ethylene/vinylene carbonate copolymer prepared as described in Example 2, were intimately blended by mixing the components for five minutes or longer on 3″ x 8″ rubber mill rolls, steam heated to about 150° C., rotating at 18 and 24 r.p.m. respectively, and having a nip clearance of 0.020 or less. During the blending operation the batch was mixed frequently by stripping from the rolls and turning using a doctor blade or knife. When the batch had been thoroughly homogenized, it was sheeted off the rolls, cooled, and cut into strips or granulated for molding and testing.

Tests of physical properties were made on the blend and also on the polyvinylidene chlorofluoride containing no ethylene/vinylene carbonate copolymer. The tests were made on test specimens compression molded at 120° C. Conditions of processing, molding, testing were identical and direct comparisons were obtained between the polyvinylidene chlorofluoride and the same material containing the ethylene/vinylene carbonate copolymer.

Data are as follows:

| Composition | Tensile Properties at Break | | Clash-Berg Data | | | Appearance |
|---|---|---|---|---|---|---|
| | Strength, p.s.i. | Elongation, Percent | $T_f$, °C. | $T_{2,000}$, °C. | Stifflex range, °C. | |
| Polyvinylidene chlorofluoride | 1,083 | 1,325 | 0 | 10 | 10 | Clear. |
| Polyvinylidene chlorofluoride ethylene/vinylene carbonate copolymer blend | 1,475 | 1,100 | -3.7 | 13.9 | 17.6 | Clear. |

It will be seen that incorporation of the ethylene/vinylene carbonate copolymer into the polyvinylidene chlorofluoride significantly reduced the brittle temperature ($T_f$) and significantly raised the so-called rubber temperature ($T_{2000}$). These effects resulted in almost doubling the transition temperature range (Stifflex range). Further, the polyvinylidene chlorofluoride was made more suitable for most uses by virtue of the large increase in the tensile strength and a moderate reduction in the tensile elongation. The components of the blend were completely compatible, as indicated by the visual observation that the blend was clear, transparent and homogeneous.

While the invention has been described with particular reference to various preferred embodiments thereof, it will be appreciated that variations from the details given herein can be effected without departing from the invention in its broadest aspects.

We claim:

1. A blend of a vinylidene chlorofluoride polymer with an ethylene-vinylene carbonate copolymer.

2. A blend of a vinylidene chlorofluoride homopolymer with an ethylene-vinylene carbonate copolymer.

3. A blend of a vinylidene chlorofluoride polymer with a normally solid polyethylene-like ethylene-vinylene carbonate copolymer containing a major proportion by weight of ethylene and a minor proportion by weight of vinylene carbonate in said copolymer.

4. An intimate admixture of from 99 to 70 parts by weight of a vinylidene chlorofluoride polymer with from 1 to 30 parts by weight of an ethylene-vinylene carbonate copolymer containing from 1 to 30 weight percent vinylene carbonate in said copolymer.

5. An intimate mechanical admixture of preformed polyvinylidene chlorofluoride with a lesser quantity by weight of a preformed ethylene-vinylene carbonate copolymer comprising a major proportion by weight of ethylene and a minor proportion by weight of vinylene carbonate in said copolymer.

6. A polymer blend containing from 95 to 85 parts by weight of polyvinylidene chlorofluoride and from 5 to 15 parts by weight of a normally solid polyethylene-like ethylene-vinylene carbonate copolymer comprising from 70 to 99 weight percent ethylene and from 30 to 1 weight percent vinylene carbonate in said copolymer.

7. A blend according to claim 1 wherein said vinylidene chlorofluoride polymer is a copolymer of vinylidene chlorofluoride with up to 15 weight percent of an ethylenically unsaturated monomer copolymerizable therewith.

8. A blend according to claim 1 made by mechanically mixing preformed vinylidene chlorofluoride polymer and preformed ethylene-vinylene carbonate copolymer.

9. A blend according to claim 1 made by polymerizing vinylidene chlorofluoride containing preformed ethylene-vinylene carbonate copolymer.

References Cited in the file of this patent

UNITED STATES PATENTS

| | | |
|---|---|---|
| 2,542,771 | Hanford et al. | Feb. 20, 1951 |
| 2,563,771 | Adelson | Aug. 7, 1951 |

OTHER REFERENCES

Heyes: 637 O.G. 591, August 8, 1950.